(12) United States Patent
Harris

(10) Patent No.: US 7,259,927 B2
(45) Date of Patent: Aug. 21, 2007

(54) METHOD AND APPARATUS FOR IMPROVING SIGNAL-TO-NOISE RATIO FOR HARD DISK DRIVES

(75) Inventor: Edward B. Harris, Orlando, FL (US)

(73) Assignee: Agere Systems, Inc., Allentown, PA (US)

( * ) Notice: Subject to any disclaimer, the term of this patent is extended or adjusted under 35 U.S.C. 154(b) by 368 days.

(21) Appl. No.: 10/619,057

(22) Filed: Jul. 14, 2003

(65) Prior Publication Data

US 2005/0013032 A1 Jan. 20, 2005

(51) Int. Cl.
    *G11B 5/09* (2006.01)
(52) U.S. Cl. .............................. 360/48; 360/75; 360/55; 360/31
(58) Field of Classification Search ................ 360/55, 360/46, 53, 63, 121, 18, 7, 26, 24; 369/59.12, 369/59.22, 60.01; 714/769, 770, 771
    See application file for complete search history.

(56) References Cited

U.S. PATENT DOCUMENTS

| | | | |
|---|---|---|---|
| 3,034,111 A * | 5/1962 | Hoagland et al. ........ 360/77.07 |
| 3,665,429 A * | 5/1972 | Thornley ..................... 360/55 |
| 4,841,502 A | 6/1989 | Murakami et al. |
| 4,926,408 A | 5/1990 | Murakami et al. |
| 4,972,396 A | 11/1990 | Rafner |
| 4,998,238 A | 3/1991 | Mizunoe et al. |
| 5,057,945 A * | 10/1991 | Shimada et al. .............. 360/22 |
| 5,161,137 A | 11/1992 | Suzuki |
| 5,263,008 A | 11/1993 | Fujio et al. |
| 5,327,417 A | 7/1994 | Tanaka et al. |
| 5,448,539 A | 9/1995 | Kamioka |
| 5,469,418 A | 11/1995 | Satoh et al. |
| 5,568,454 A | 10/1996 | Shima et al. |
| 5,602,693 A | 2/1997 | Brunnett et al. |
| 5,631,893 A | 5/1997 | Kang et al. |
| 5,796,557 A | 8/1998 | Bagnell et al. |
| 5,805,619 A * | 9/1998 | Gardner et al. ............... 360/51 |
| 5,880,901 A * | 3/1999 | Smith et al. .................. 360/75 |
| 6,038,095 A * | 3/2000 | Ohgaki et al. ........... 360/77.13 |
| 6,091,559 A * | 7/2000 | Emo et al. ..................... 360/48 |
| 6,163,439 A | 12/2000 | Jeong |
| 6,172,836 B1 | 1/2001 | Bang |
| 6,181,504 B1 | 1/2001 | Ahn |
| 6,204,660 B1 | 3/2001 | Lee |
| 6,366,081 B1 * | 4/2002 | Tan et al. ...................... 360/31 |
| 6,429,984 B1 * | 8/2002 | Alex ............................ 360/31 |
| 6,445,525 B1 * | 9/2002 | Young .......................... 360/51 |
| 6,628,465 B2 * | 9/2003 | Yong ........................... 360/31 |
| 6,633,442 B2 * | 10/2003 | Quak et al. .................... 360/31 |
| 6,977,970 B2 * | 12/2005 | Shim et al. .................... 360/65 |

* cited by examiner

*Primary Examiner*—Andrea Wellington
*Assistant Examiner*—Dismery Mercedes

(57) ABSTRACT

A hard disk drive comprising a plurality of read/write heads oriented to serially read data from the magnetic media of the disk drive. The head output signals are delayed and combined to provide a time aligned composite signal for determining the value of the data bits read from the disk drive. An improved signal-to-noise ratio is provided according to the teachings of the present invention by combining the signal components from the plurality of heads, as the signal components are added algebraically while the noise components are combined as root mean square values. Thus the overall signal-to-noise ratio is improved, resulting in a greater probability of correctly determining the stored data.

13 Claims, 4 Drawing Sheets

METHOD AND APPARATUS FOR IMPROVING SIGNAL-TO-NOISE RATIO FOR HARD DISK DRIVES

FIELD OF THE INVENTION

The present invention relates to hard disk drives and other mass storage medias, and more particularly to a method and apparatus for reducing the signal-to-noise ratio of a signal representing a data bit read from such media.

BACKGROUND OF THE INVENTION

A hard disk drive 10, as illustrated in FIG. 1, comprises a platter 12 constructed of magnetic material for storing information, in the form of data bits, for processing by a computing or processing device. The information is stored on the platter 12 by magnetizing small magnetic domains that retain the magnetization and thus can be magnetized to store a zero data bit or a one data bit. A motor (not shown in FIG. 1) spins the platter 12 (typically at speeds of 3,600 or 7,200 revolutions per minute) allowing a read/write head 14 to write data to or read data from the platter 12 as the read/write head 14 travels over the surface of the platter 12. The read/write head 14 does not make physical contact with the platter 12.

The read/write head 14 is affixed to an arm 16 controlled by a positioning mechanism 18 for moving the arm across an upper surface of the platter 12, between an edge 24 and a hub 26. Data bits are stored on the platter 12 in sectors 30 on concentric tracks 32. Typically, a sector contains a fixed number of bytes (for example, 256 or 512). A plurality of sectors are commonly grouped together into a cluster.

As illustrated in FIG. 2, to increase storage capacity a hard disk drive typically comprises a plurality of parallel platters 12A, 12B and 12G Read/write heads 14A through 14F write data to and read data from a top and bottom surface of each of the platters 12A, 12B and 12C The depiction of three platters and six read/write heads illustrated in FIG. 2 is merely exemplary.

The positioning mechanism 18 conventionally employs a high-speed linear motor or a voice coil motor to move the arm 16. In the voice coil embodiment, the voice coil is located adjacent to a magnet, which together operatively define the voice coil motor of the positioning mechanism 18. The hard disk drive 10 further comprises a controller (not shown) for providing current to excite and control the voice coil motor of the positioning mechanism 18. The excited voice coil motor rotates the arm 16, moving the head 14 across the surface of the platter 12 along an arc.

Data bits are written to and read from the hard disk drive 10, utilizing a magneto-resistive transducer as a sensing and writing element within the read/write head 14. The voice coil motor moves the arm 16 to a desired radial position on the surface of the platter 12, after which the head 14 electromagnetically writes data to the platter 12 or senses magnetic field signal changes to read data from the platter 12. The arm 16 is shaped and controlled such that it "flies" over the surface of the platter 12 as the latter rotates beneath it. Contact between the head 14 and the platter 12 is not desired.

Conventional transducers comprising the read/write head 14 employ a magnetically permeable core coupled with a conductive coil to read and write data on the surface of the platter 12. A write operation is typically performed by applying a current to the coil, thereby inducing a magnetic field in the adjacent magnetically permeable core. The magnetic field extends across the air gap between the head 14 and the platter 12 to magnetize a small region of magnetic domains to store the data bit. Information is read from the platter 12 when the magnetized region induces a voltage in the coil. Alternatively, reading can be performed using a magneto-resistive sensor, where the resistance varies as a function of the proximate magnetic field.

To increase the amplitude (and thus the signal-to-noise ratio) and the detection accuracy of the data bits as they are read from the platter 12, the head 14 is positioned as close to the platter 12 as possible. However, the low amplitude voltage signals produced in the head 14 during the read operation typically exhibit a low signal-to-noise ratio. Also, the high frequencies involved in the read operation tend to increase noise in the voltage signal. It is advantageous to improve the signal-to-noise ratio of the read signal to improve the accuracy (i.e., reduce the error rate) of data bit detection.

Known techniques for increasing the signal-to-noise ratio have focused on increasing the signal level and reducing noise in the head output signal, thus reducing noise effects that must otherwise be accommodated during the subsequent signal processing. Error detecting/correcting codes can be appended to the data words to account for noise effects. However, this technique increases the total number of bits (i.e., data bits plus error detecting/correcting bits) required to store information on the hard disk drive 10 and thus reduces the effective hard disk drive capacity. So called "giant magneto resistance detectors" generally produce a higher output voltage and thus have a higher signal-to-noise ratio than the inductive coil described above. Also, as the materials comprising the magneto-resistive device are improved to generate less noise during the reading process, the signal-to-noise ratio improves. Certain regions of the noise spectrum can also be filtered from the read signal using spectral filters. However, noise voltage remains in the spectral region processed by the signal processing circuitry to detect the data bits.

BRIEF SUMMARY OF THE INVENTION

A hard disk drive comprises a magnetic storage disk having magnetic regions that are magnetized to store data bits. A plurality of read heads in proximate relation to the storage disk determine the magnetization of the magnetic regions as the storage disk moves relative to the read heads. The heads are oriented to successively read the same magnetic region, each producing a signal representative of the magnetization of a given region. A detector responsive to the signals determines the data bit value represented by the magnetized region.

BRIEF DESCRIPTION OF THE DRAWINGS

The present invention can be more easily understood and the advantages and uses thereof more readily apparent, when considered in view of the following detailed description of the preferred embodiment when read in conjunction with the following figures wherein.

In accordance with common practice, the various features of the present invention are not drawn to scale, but are drawn to emphasize specific features relevant to the invention. Reference characters denote like elements throughout the figures and text.

DETAILED DESCRIPTION OF THE INVENTION

Figure 1:
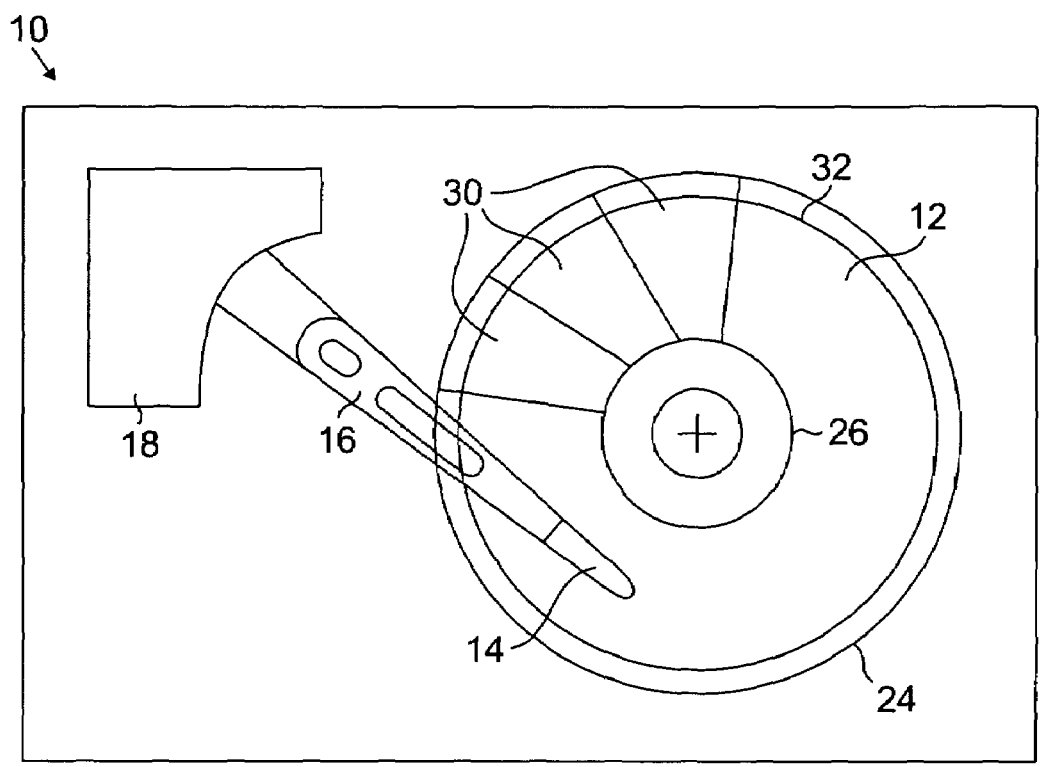
FIGS. 1 and 2 illustrate elements of a prior art hard disk drive.
Figure 2:
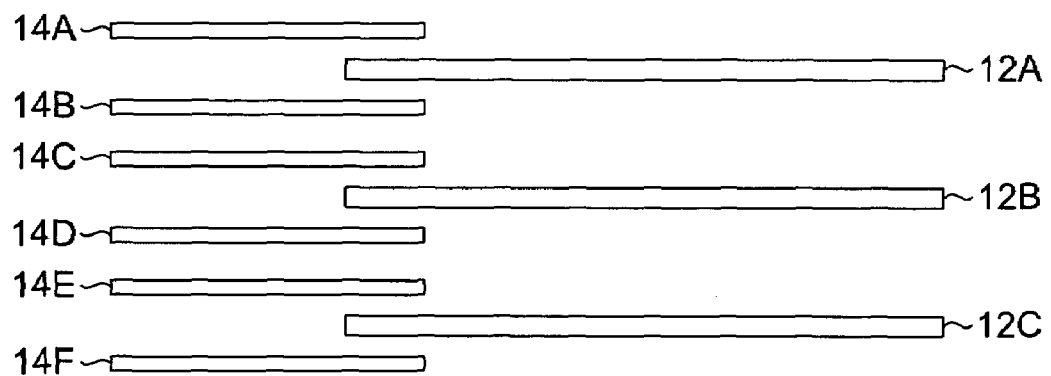

Before describing in detail the particular hard disk drive in accordance with the present invention, it should be observed that the present invention resides primarily in a novel combination of elements. Accordingly, the elements have been represented by conventional elements in the drawings, showing only those specific details that are pertinent to the present invention so as not to obscure the disclosure with structural details that will be readily apparent to those skilled in the art having the benefit of the description herein.

Figure 3:
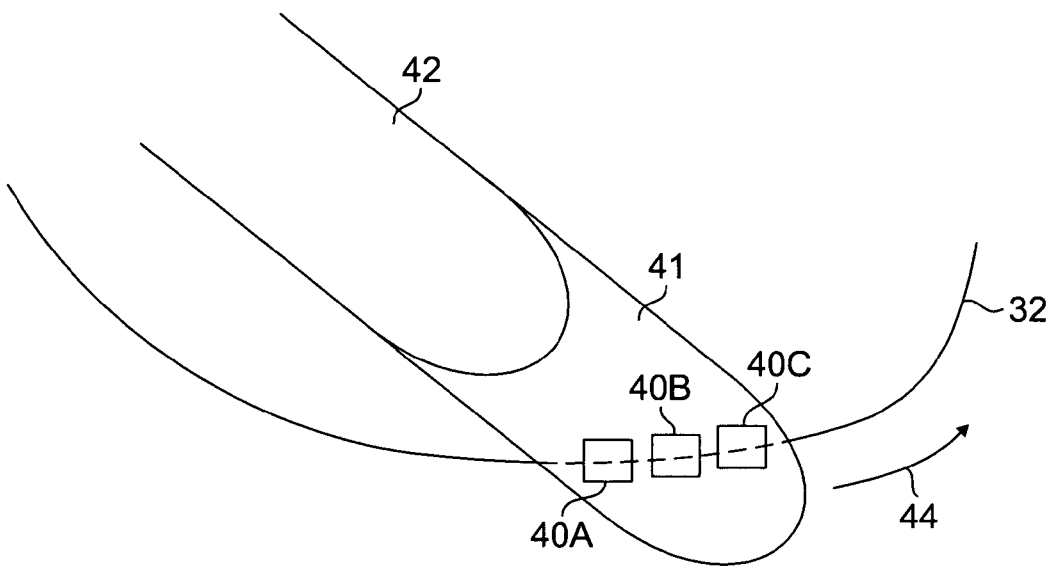
FIG. 3 illustrates a hard disk drive head constructed according to the teachings of the present invention.

FIG. 3 illustrates three heads 40A, 40B, and 40C disposed at an end 41 of an arm 42. The heads 40A through 40C are positioned on the arm 41 such that each passes over the same segment of the track 32 and thus each head 40A through 40C reads the same data from the platter 12, with a time delay between each of the three read operations. According to the teachings of the present invention, the earlier read signals are delayed such that the three read signals are concurrent in time for processing to determine the read data bit value. In this embodiment, the platter 12 is assumed to rotate in the direction indicated by an arrowhead 44. Thus the head 40A first encounters the data bit to be read from the track 32, followed by the read heads 40B and 40C.

Figure 4:
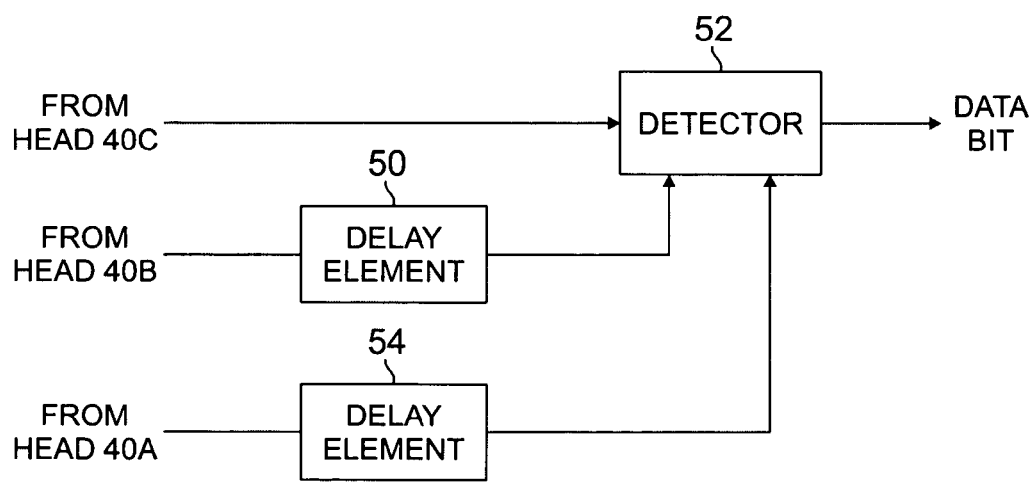
FIG. 4 is block digram illustrating certain components of the present invention operative with the disk heads of FIG. 3.

As illustrated in FIG. 4, a delay element 50 is disposed between the head 40B and a detector 52. A delay element 54 is disposed between the head 40A and the detector 52. It is assumed that the head 40C is the last to read the data bit from the platter 12; thus in this embodiment it is unnecessary to delay the output signal therefrom. According to the present invention, three time-aligned signals representing the read data bit value are presented as inputs to the detector 52. The output signal from the detector 52 represents the data bit. Although the embodiment of FIG. 4 illustrates the delay elements 50 and 54 as separate components, this is merely done for explanatory purposes, while in another embodiment, the delay functions can be incorporated into the detector 52. Signal processing elements capable of functioning as the delay elements 50 and 54, are known in the art. For example, the signal processing elements can comprise sample and hold circuits to implement the required delay. The delay can also be implemented using resistor-capacitor and resistor inductor combinations, and delay lines.

Figure 5A:
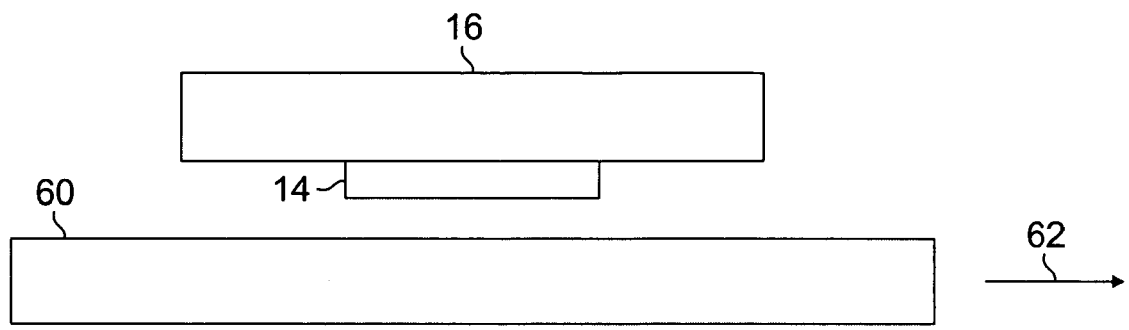
FIGS. 5A and 5B illustrates the output signal from a prior art read head.

FIG. 5A is a cross-sectional view of a section 60 of the platter 12, as disclosed by the prior art. An arrowhead 62 indicates direction of movement of the section 60 relative to the arm 16 and the head 14.

Figure 5B:
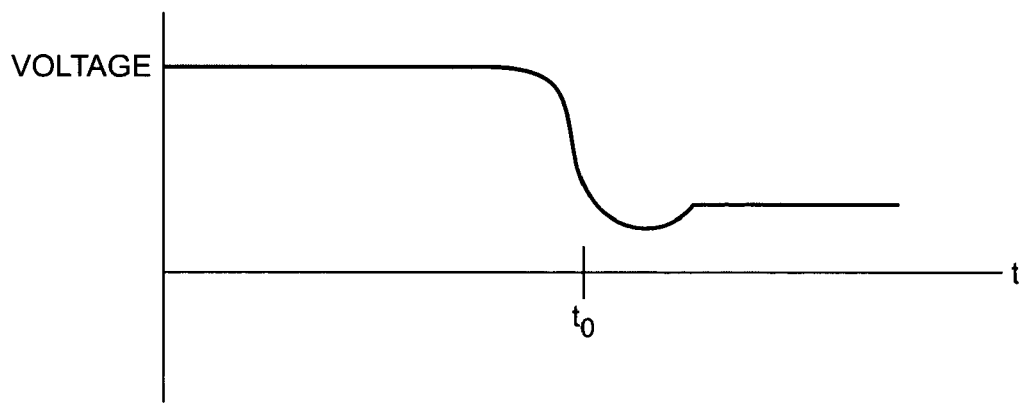

FIG. 5B illustrates the output voltage from the head 14, with respect to time, as induced in the head 14 by a magnetic domain region of the platter 12 during a read operation. The voltage signal is processed (within a detector such as the detector 52 of FIG. 4) to determine whether the magnetic domain region stores a one bit or a zero bit.

Figure 6A:
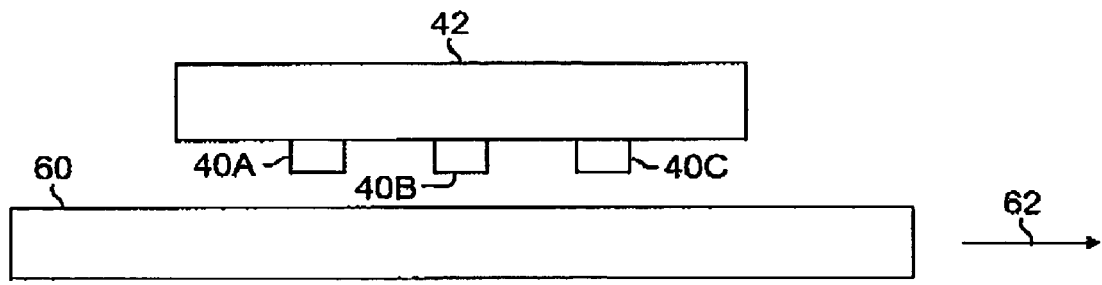
FIGS. 6A and 6B illustrate the output signals from a read head according to the teachings of the present invention.
Figure 6B:
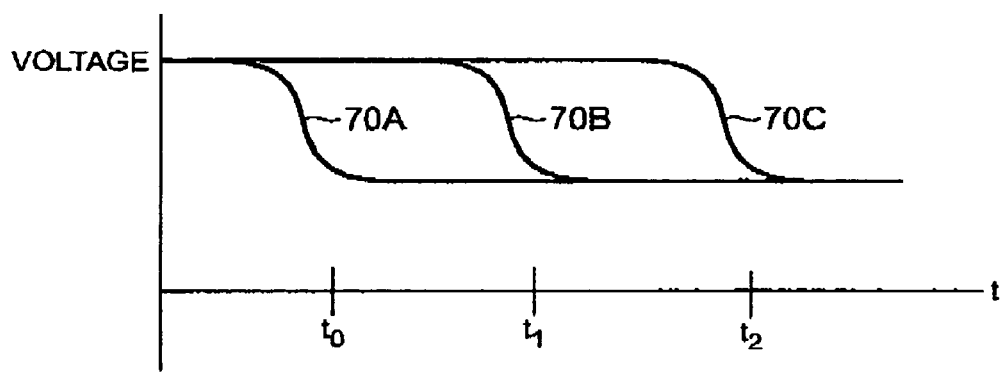

As illustrated in the cross-sectional view of FIG. 6A, according to the teachings of the present invention, the arm 42 carries the three heads 40A through 40C The output signals from the heads 40A through 40C are represented in FIG. 6B by three voltage signals 70A, 70B and 70C, respectively. The signal 70A indicates that during a read operation the output voltage from the head 40A dropped at time $t_0$. The signal 70B indicates that the output voltage from the head 40B dropped at time $t_1$ during the same read operation, but later in time by the difference between $t_0$ and $t_1$. The signal 70C indicates that the output voltage from the head 40C dropped at time $t_2$, again during the same read operation. As described with reference to FIG. 4, the voltage waveforms 70B and 70C are delayed to achieve time alignment with the voltage waveform 70A. As can be appreciated by those skilled in the art, the depiction of three heads is merely exemplary, while in another embodiment more or fewer, but at least two, heads can be used during the read operation.

Within the detector 52, the head output voltage signals are analyzed to determine whether the voltage represents a one bit or a zero bit. Those skilled in the art are familiar with such techniques for the detection of digital data from a voltage signal such as obtained by reading from magnetic domain regions. Detection accuracy (e.g., as measured by the bit error rate) is important for successful operation of the computing or data processing device operative with the hard disk drive 10. According to the embodiment comprising three heads 40A, 40B and 40C, within the detector 52 of FIG. 4, the three time aligned head signals are averaged, thereby increasing the signal component and reducing the noise component to effect an improvement in the signal-to-noise ratio of the combined voltage waveform.

The signal averaging function can be accomplished using various known techniques, including transmission delay lines, all pass filters, and resistance-capacitance filters. With an improvement in the signal-to-noise ratio as taught by the present invention, the likelihood of a correct detection is improved and the likelihood of an incorrect detection is reduced. Thus, use of a hard disk drive incorporating the teachings of the present invention may render unnecessary the prior art error detection and correction techniques, such as the use of error correcting techniques. With a reduction in the error correction/detection bits, the amount of hard disk space allocated to information bits is commensurately increased, as is the data storage capacity of the hard disk drive.

Let the output signals from the heads 40A, 40B and 40C be designated as signals S1, S2 and S3 respectively, and let the noise components of the output signals from each head 40A, 40B and 40C be designated as n1, n2 and n3. Within the detector 52, the signals are summed such that $S_{total}=S1+S2+S3$. For the more general case where there are N heads, the total signal magnitude is $S_{total}=N*S1$ (assuming the equivalent output signals from each of the heads).

However, the noise components are random and add as root means square (RMS) values, such that $n_{total}=SQRT(n1^2+n2^2+n3^2)$. For the more general case of N heads, the total noise voltage magnitude is approximately $n_{total}=SQRT(N)*n1$ (assuming an equivalent noise voltage at each head).

According to the prior art hard disk drives, the signal-to-noise ratio of a single read head is $S1/n1$. The signal-to-noise ratio of the combined head output signals, according to the teachings of the present invention is $S_{total}/n_{total}=N*S1/(SQRT(N)*n1)=SQRT((N)*(S1/n1))$. As can be seen there is a SQRT(N) improvement in the signal-to-noise ratio according to the teachings of the present invention.

The teachings of the present invention are further applicable to other types of data storage media, such as magnetic storage devices, including floppy disks, magnetic tapes, and magnetic card strips. Optical storage devices, e.g., digital video disks DVD's) and compact disk read only memories (CD ROM's) can also benefit from the teachings of the present invention. The reading apparatus of such devices is modified, according to the teachings of the present invention, to produce at least two output signals representative of the stored data bit. The output signals are processed according to the teachings of the present invention to produce a composite signal having a reduced signal-to-noise ratio, thus improving detection accuracy of the read operation.

While the invention has been described with reference to preferred embodiments, it will be understood by those skilled in the art that various changes may be made and equivalent elements may be substituted for elements thereof without departing from the scope of the present invention. Further, the scope of the present invention may include any combination of the elements from the various embodiments set forth herein. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. A hard disk drive comprising:
   a magnetic storage disk comprising magnetic regions, wherein data bits are represented by the magnetization of the magnetic regions;
   a plurality of read heads in proximate relation to the storage disk for determining the magnetization of the magnetic regions as the storage disk moves relative to the plurality of read heads, wherein each one of the plurality of read heads produces a signal representative of the magnetization, and wherein the plurality of heads are positioned to serially read the same magnetic regions; and
   a detector responsive to the signals for averaging the signals produced by each one of the plurality of read heads and in response thereto determining the data bit value represented by the magnetization.

2. The hard disk drive of claim 1 wherein the magnetic regions comprise magnetic domains, and wherein a data bit is stored in each magnetic domain by magnetization of the magnetic domain during a write operation.

3. The hard disk drive of claim 2 wherein each one of the plurality of heads produces the signal representative of a read data bit in response to the magnetization of the magnetic domain.

4. The hard disk drive of claim 1 wherein the data bits are stored along concentric tracks of the magnetic storage disk, and wherein the plurality of heads are oriented on a circular arc such that the plurality of heads serially read the data bits stored along the track.

5. The hard disk drive of claim 1 wherein the plurality of heads are positioned to successively read the same data bits as the storage disk moves relative to the plurality of read heads.

6. The hard disk drive of claim 1 wherein the detector further comprises a delay element for delaying one or more of the signals representative of the magnetization to produce one or more time-aligned signals.

7. The hard disk drive of claim 6 wherein the time-aligned signals are averaged to form a composite signal for processing by the detector, and wherein the composite signal has a greater signal-to-noise ratio than the time-aligned signals.

8. The hard disk drive of claim 1 wherein each one of the plurality of read heads comprises a magneto-resistive sensor.

9. A method for reading data bits from a hard disk drive comprising a magnetic storage disk, wherein magnetized regions of the magnetic storage disk represent the data bits, comprising:
   producing a plurality of signals representative of the magnetization of a selected magnetized region of the magnetic storage disk by a plurality of read heads moving serially relative to the magnetic storage disk;
   averaging the plurality of signals to determine the data bit value represented by the magnetized region.

10. The method of claim 9 further comprising time-aligning the plurality of signals.

11. The method of claim 10 wherein the step of time-aligning the plurality of signals comprises delaying one or more of the plurality of signals.

12. The method of claim 9 wherein the plurality of signals are sequentially generated.

13. The method of claim 12 wherein the step of combining further comprises introducing time delays to one or more of the plurality of signals.

* * * * *